(12) United States Patent
Kuboi et al.

(10) Patent No.: US 12,054,641 B2
(45) Date of Patent: Aug. 6, 2024

(54) ANTIBACTERIAL-COATED PRODUCT, ANTIBACTERIAL COATING MATERIAL, METHOD FOR MANUFACTURING ANTIBACTERIAL COATING MATERIAL, AND METHOD FOR MANUFACTURING ANTIBACTERIAL-COATED PRODUCT

(71) Applicant: KUBOI COATING WORKS CO., LTD., Sayama (JP)

(72) Inventors: Kaname Kuboi, Sayama (JP); Nobushige Numa, Ebina (JP); Kaoru Shibata, Kanagawa (JP)

(73) Assignee: KUBOI COATING WORKS CO., LTD., Sayama (JP)

( * ) Notice: Subject to any disclaimer, the term of this patent is extended or adjusted under 35 U.S.C. 154(b) by 850 days.

(21) Appl. No.: 15/733,823

(22) PCT Filed: Jun. 11, 2020

(86) PCT No.: PCT/JP2020/022984
§ 371 (c)(1),
(2) Date: Nov. 30, 2020

(87) PCT Pub. No.: WO2020/255848
PCT Pub. Date: Dec. 24, 2020

(65) Prior Publication Data
US 2021/0261792 A1  Aug. 26, 2021

(30) Foreign Application Priority Data
Jun. 21, 2019 (JP) ................ 2019-115667

(51) Int. Cl.
| | |
|---|---|
| *C09D 5/14* | (2006.01) |
| *B05D 5/00* | (2006.01) |
| *B05D 7/24* | (2006.01) |
| *C09D 5/03* | (2006.01) |
| *C09D 7/62* | (2018.01) |
| *C09D 201/00* | (2006.01) |

(52) U.S. Cl.
CPC ............ *C09D 5/14* (2013.01); *B05D 5/00* (2013.01); *B05D 7/24* (2013.01); *C09D 5/031* (2013.01); *C09D 5/032* (2013.01); *C09D 7/62* (2018.01); *C09D 201/00* (2013.01)

(58) Field of Classification Search
CPC ......... C09D 5/14; C09D 5/031; C09D 201/00
See application file for complete search history.

(56) References Cited

U.S. PATENT DOCUMENTS

| | | | |
|---|---|---|---|
| 2011/0212832 A1 | 9/2011 | Nakano et al. | |
| 2019/0099741 A1 | 4/2019 | Furudate et al. | |

FOREIGN PATENT DOCUMENTS

| | | | |
|---|---|---|---|
| CN | 109566648 A | 4/2019 |
| JP | 2004339102 A | 12/2004 |
| JP | 2006008902 A | 1/2006 |
| JP | 2009057349 A | 3/2009 |
| JP | 2009161708 A | 7/2009 |
| JP | 5207744 B2 | 6/2013 |
| JP | 2014040416 A | 3/2014 |
| JP | 2014065182 A | 4/2014 |
| JP | 2017128809 A | 7/2017 |
| JP | 2018144004 A | 9/2018 |

OTHER PUBLICATIONS

International Preliminary Report on Patentability, dated Dec. 21, 2021, for corresponding international application PCT/JP2020/022984 (1 page).
Notification Concerning Transmittal of International Preliminary Report on Patentability, mailed Dec. 30, 2021, for corresponding international application PCT/JP2020/022984 (1 page).
Notification of Transmittal of Translation of the International Preliminary Report on Patentability, mailed Dec. 30, 2021, for corresponding international application PCT/JP2020/022984 (1 page).
Written Opinion of the International Searching Authority, mailed Aug. 25, 2020, for corresponding international application PCT/JP2020/022984 (7 page).
International Search Report (ISR) mailed Aug. 25, 2020, issued for International application No. PCT/JP2020/022984. (2 pages).
A Second Office Action issued by the State Intellectual Property Office of China on Jun. 6, 2022, for Chinese counterpart application No. 202080002894.1 (6 pages).

*Primary Examiner* — Alexander C Kollias
(74) *Attorney, Agent, or Firm* — Law Office of Katsuhiro Arai

(57) ABSTRACT

An antibacterial coated product includes, on a base material, a coating film of an antibacterial coating material that contains at least composite ceramic powders containing a photocatalytic component, adsorbent component, and metal component, and a binder, wherein the antibacterial activity (JIS Z 2801: 2010) of the coating film is 2.0 or higher and the requirement(s) of (1) and/or (2) below is/are satisfied: (1) with respect to the composite ceramic powder in the antibacterial coating material, the volume average dispersed particle diameter ($D_{50}$) is 250 nm or smaller, and the ratio of the 90% cumulative volume particle diameter ($D_{90}$) and the volume average dispersed particle diameter ($D_{50}$), or $D_{90}/D_{50}$, is 1.5 or lower; and (2) the thickness of the coating film is 80 μm or smaller and the haze (JIS K 7136: 2000) of the antibacterial coated product or coating film is 25 or lower.

4 Claims, No Drawings

ANTIBACTERIAL-COATED PRODUCT, ANTIBACTERIAL COATING MATERIAL, METHOD FOR MANUFACTURING ANTIBACTERIAL COATING MATERIAL, AND METHOD FOR MANUFACTURING ANTIBACTERIAL-COATED PRODUCT

CROSS-REFERENCE TO RELATED APPLICATIONS

This application is the U.S. National Phase under 35 U.S.C. § 371 of International Application PCT/JP2020/022984, filed Jun. 11, 2020, which claims priority to Japanese Patent Application No. JP2019-115667, filed Jun. 21, 2019. The International Application was published under PCT Article 21(2) in a language other than English.

TECHNICAL FIELD

The present invention relates to an antibacterial coated product, an antibacterial coating material, a method for manufacturing antibacterial coating material, and a method for manufacturing antibacterial coated product, each characterized in that the coating film has an antibacterial activity (according to JIS Z 2801: 2010) of 2.0 or higher.

BACKGROUND ART

Recent years have seen growing needs, at medical institutions, commercial facilities, schools, public facilities, food factories, mass transit systems, etc., for adding antibacterial performance to handrails, operation buttons, and other articles touched by the general public, as well as to mobile communication terminals, keyboards, mouse devices, touch panels, and other articles directly touched by fingers, from the sanitation viewpoint of preventing infectious diseases from occurring or spreading, for example.

Various arts of adding antibacterial performance meeting general standards to articles, etc., for the purpose of inhibiting growth and multiplication of bacteria attaching thereto, are known. Among these, the arts of applying an antibacterial coating material to constitute an antibacterial coated product allow antibacterial performance to be added easily through post-processing, where antibacterial performance can be added even to the surfaces of articles having complex shapes.

Traditional antibacterial coated products present a problem in that evenly dispersing an antibacterial agent over the entire coating film surface is difficult and that antibacterial action does not manifest in areas where there is no antibacterial agent.

Additionally, use of an antibacterial agent of high specific gravity causes the antibacterial agent to sink into the coating film under standard coating methods and consequently the antibacterial agent becomes thin at the coating film surface, while use of an antibacterial agent of low specific gravity or employment of a special coating method that lets an antibacterial agent disperse unevenly in the surface layer of coating film causes the antibacterial agent to become thin in the underlayer of coating film—either way, the outcome is that making antibacterial performance manifest in a stable manner over a long period of time becomes difficult.

Arts of adding antibacterial property to the coating film surface by causing an antibacterial agent to elute from the coating film, have also been developed. However, there are problems including the long time required before elution starts, unstable elution quantity, difficulty determining when elution has ended, and concerns for rashes and other skin disorders caused by the eluting antibacterial agent.

For the prevention of nosocomial infections, medical institutions have needs to apply antibacterial specifications of 2.0 or higher in antibacterial activity, not only to articles, etc., touched by the general public, but also to the operation buttons, keyboards, mouse devices, touch panels, enclosures, etc., of personal computers, electronic medical charts, medical devices, mobile communication terminals, etc., used by medical professionals. Furthermore, there are also needs to ensure that the antibacterial performance specifications, in addition to having an antibacterial activity of 2.0 or higher, allow long-lasting antibacterial performance to be added easily through post-processing, do not cause chemical sensitivity (sick house syndrome), provide a high degree of transparency in the antibacterial-treated areas, have an odor elimination function, keep the transparent antibacterial-treated areas still visible, and make the antibacterial-treated areas look clean, for example.

From the viewpoints of antibacterial performance, chemical sensitivity protection, odor prevention function, etc., antibacterial coated products on whose surface an antibacterial coating film containing a photocatalytic compound has been formed, are also in practical use. However, since normal photocatalytic compounds express photocatalytic effect when irradiated with ultraviolet light, causing them to express sufficient photocatalytic effect in an indoor environment is difficult. Visible light-responsive photocatalysts have also been developed, but they have narrow excitation wavelength ranges and thus are unable to express sufficient photocatalytic effect under general indoor lighting. Another problem is that coating films containing photocatalytic compounds are normally white in color and have poor transparency.

Prior arts relating to antibacterial coating materials/antibacterial coated products are cited in Patent Literatures 1 to 4, for example.

Patent Literature 1 discloses an antibacterial coated product that has been coated with an aqueous coating material containing apatite-coated photocatalytic titanium dioxide particles whose median diameter $D_{50}$ is in a specific range, and silver grains whose average grain diameter $D_{50}$ is in a specific range, wherein at least some of the silver grains are supported on the apatite of the apatite-coated photocatalytic titanium dioxide particles. To be specific, disclosed therein is an antibacterial coated product that has been coated with an aqueous coating material obtained by mixing under agitation a fluid dispersion of apatite-coated photocatalytic titanium dioxide particles of 0.2423 µm in $D_{50}$, a dispersion of nano-silver grains of 48 nm in $D_{50}$, and other components such as a binder. However, distributed particle diameter of the apatite-coated photocatalytic titanium dioxide particles on which silver grains are supported, and antibacterial activity of the coating film, are not disclosed. Additionally, the method for manufacturing this antibacterial coated product presents potential problems such as the coating film taking on color due to the free silver grains that are not supported, and gives no consideration to the transparency and abrasion resistance of the coating film.

Patent Literature 2 discloses, with respect to a sterilized film obtained by applying a coating material that contains a composite material—which is constituted in such a way that a photocatalyst supporting metal grains on its surface, such as calcium phosphate (hydroxyapatite)-coated anatase titanium oxide supporting silver grains, is coated with an inorganic adsorbent—as well as a resin binder, limiting to a specific range the grain diameter of each of the respective components constituting the composite material. However, dispersed particle diameter of the composite material itself, and antibacterial activity of the coating film, are not disclosed at all.

Patent Literature 3 describes a sterilizing agent manufactured by causing silver or other metal grains to bond to ceramic grains of photocatalytic titanium oxide, etc., according to a prescribed method, wherein the sterilizing agent further contains hydroxyapatite or other adsorptive material, for use in a coating material. However, dispersed particle diameter of the sterilizing agent containing adsorptive materials (ceramic grains bonded with the metal grains) in the coating material, and antibacterial activity of the coating film, are not disclosed at all.

Patent Literature 4 describes an antibacterial coated product whose coating film has an antibacterial activity of 2.0 or higher, wherein the antibacterial coated product has a coating material applied on it which is a specific organic solvent containing superfine silver particles of 100 nm or smaller in average grain diameter with a fatty acid component bonded to the grain surface, and whose transmittance is 90% or higher.

However, this antibacterial coated product uses the sterilizing action based on superfine silver particles.

BACKGROUND ART LITERATURE

Patent Literature

Patent Literature 1: Japanese Patent No. 5207744
Patent Literature 2: Japanese Patent Laid-open No. 2014-065182
Patent Literature 3: Japanese Patent Laid-open No. 2014-040416
Patent Literature 4: Japanese Patent Laid-open No. 2017-128809

SUMMARY OF THE INVENTION

Problems to be Solved by the Invention

An object of the present invention is to provide an antibacterial coated product, an antibacterial coating material, a method for manufacturing antibacterial coating material, and a method for manufacturing antibacterial coated product, each characterized in that the coating film has an antibacterial activity (according to JIS Z 2801: 2010) of 2.0 or higher.

Additionally, an object of the present invention is to provide an antibacterial coated product, an antibacterial coating material, a method for manufacturing antibacterial coating material, and a method for manufacturing antibacterial coated product, each characterized in that the antibacterial activity of the coating film is 2.0 or higher and the coating film has excellent transparency.

Furthermore, an object of the present invention is to provide an antibacterial coating material which can be used, through a simple application on the surface of an article, etc., requiring antibacterial treatment, to constitute an antibacterial coated product that has been antibacterial-treated to an antibacterial activity of 2.0 or higher and which does not induce skin disorders, etc. caused by elution of the antibacterial component, and manifest antibacterial effect over a long period of time starting from immediately after the formation of the coating film, as well as a method for manufacturing the antibacterial coating material, an antibacterial coated product using the antibacterial coating material, and a method for manufacturing the antibacterial coated product.

Means for Solving the Problems

The inventors of the present invention studied in earnest to achieve the aforementioned objects.

As a result, they found that the aforementioned objects could be achieved by an antibacterial coating material that contains a composite ceramic powder containing a photocatalytic component, adsorbent component, and metal component, and a binder, as well as by an antibacterial coated product having, on a base material, a coating film of a coating material that contains the antibacterial coating material, and also satisfying specific requirements.

To be specific, the solutions are as described below.

[1] An antibacterial coated product having, on a base material, a coating film of an antibacterial coating material that contains at least a composite ceramic powder containing a photocatalytic component, adsorbent component, and metal component, and a binder, wherein the antibacterial activity (according to JIS Z 2801: 2010) of the coating film is 2.0 or higher and the requirement(s) of (1) and/or (2) below is/are satisfied:

(1) with respect to the composite ceramic powder in the antibacterial coating material, the volume average dispersed particle diameter ($D_{50}$) is 250 nm or smaller, and the ratio of the 90% cumulative volume particle diameter ($D_{90}$) and the volume average dispersed particle diameter ($D_{50}$), or $D_{90}/D_{50}$, is 1.5 or lower; and (2) the thickness of the coating film is 80 μm or smaller and the haze (according to JIS K 7136: 2000) of the antibacterial coated product or coating film is 25 or lower.

[2] An antibacterial coating material that contains at least a composite ceramic powder containing a photocatalytic component, adsorbent component, and metal component, and a binder, wherein:

the volume average dispersed particle diameter ($D_{50}$) of the composite ceramic powder in the antibacterial coating material is 250 nm or smaller, and the ratio of the 90% cumulative volume particle diameter ($D_{90}$) and the volume average dispersed particle diameter ($D_{50}$), or $D_{90}/D_{50}$, of the composite ceramic powder, is 1.5 or lower; and the antibacterial activity (according to JIS Z 2801: 2010) of the coating film is 2.0 or higher.

[3] A method for manufacturing an antibacterial coating material whose coating film has an antibacterial activity (according to JIS Z 2801: 2010) of 2.0 or higher, which includes a step to mix, using a dispersing machine, constitutive components of the antibacterial coating material including at least a composite ceramic powder containing a photocatalytic component, adsorbent component, and metal component, and a binder, wherein:

the volume average dispersed particle diameter ($D_{50}$) of the composite ceramic powder in the antibacterial coating material is set to 250 nm or smaller, and the ratio of the 90% cumulative volume particle diameter ($D_{90}$) and the volume average dispersed particle diameter ($D_{50}$), or $D_{90}/D_{50}$, of the composite ceramic powder, is set to 1.5 or lower.

[4] A method for manufacturing an antibacterial coated product whose coating film has an antibacterial activity (according to JIS Z 2801: 2010) of 2.0 or higher, produced by applying on a base material a coating material that contains the antibacterial coating material according to [2].

Effects of the Invention

According to the present invention, an antibacterial coated product, an antibacterial coating material, a method for manufacturing antibacterial coating material, and a method for manufacturing antibacterial coated product, each characterized in that the antibacterial activity of the coating film is 2.0 or higher, are provided.

Also, according to the present invention, an antibacterial coated product, an antibacterial coating material, a method for manufacturing antibacterial coating material, and a method for manufacturing antibacterial coated product, each characterized in that the antibacterial activity of the coating film is 2.0 or higher and the coating film has excellent transparency, are provided. Having excellent transparency, the coating film under the present invention can serve as a colorless, transparent coating film offering the required undersurface visibility, etc., or the coating film may be colored as desired.

Furthermore, according to the present invention, an antibacterial coating material which can be used, through a simple application on the surface of an article, etc., requiring antibacterial treatment, to constitute an antibacterial coated product that has been antibacterial-treated to an antibacterial activity of 2.0 or higher and which does not induce skin disorders, etc. caused by elution of the antibacterial component, and can manifest antibacterial effect over a long period of time starting from immediately after the formation of the coating film, is provided, along with an antibacterial coated product, a method for manufacturing antibacterial coating material, and a method for manufacturing antibacterial coated product.

The antibacterial coated product proposed by the present invention contains a photocatalytic component and adsorbent component in the coating film, and therefore provides functions to adsorb/break down or otherwise disable the substances that cause chemical sensitivity (sick house syndrome), and eliminate odor, for example.

MODE FOR CARRYING OUT THE INVENTION

Modes for carrying out the present invention are explained. It should be noted that the present invention is not limited by the following modes and embodiments and may be implemented by adding modifications as deemed appropriate.

In this Specification, "antibacterial activity" refers to the index value according to JIS Z 2801: 2010, while "haze" refers to the index value according to JIS K 7136: 2000.

1 Antibacterial Coated Product

The antibacterial coated product proposed by the present invention represents an antibacterial coated product having, on a base material, a coating film of an antibacterial coating material that contains at least a composite ceramic powder containing a photocatalytic component, adsorbent component, and metal component, and a binder, wherein the antibacterial activity of the coating film is 2.0 or higher and the requirement(s) of (1) and/or (2) below is/are satisfied:

(1) with respect to the composite ceramic powder in the antibacterial coating material, the volume average dispersed particle diameter ($D_{50}$) is 250 nm or smaller, and the ratio of the 90% cumulative volume particle diameter ($D_{90}$) and the volume average dispersed particle diameter ($D_{50}$), or $D_{90}/D_{50}$, is 1.5 or lower; and (2) the thickness of the coating film is 80 μm or smaller and the haze of the antibacterial coated product or coating film is 25 or lower.

[Antibacterial Coating Material]
<Composite Ceramic Powder>
(Photocatalytic Component)

The photocatalytic component is a substance that absorbs ultraviolet light, visible light, or other light to exhibit photocatalytic action. When light is absorbed, excited electrons and electron holes are produced in the photocatalyst, which then demonstrate reducing action and oxidizing action, respectively, to initiate a reaction that breaks down any organic matters or bacteria adsorbed onto the surface of the adsorptive agent.

The photocatalytic component is a metal oxide, metal oxynitride, or any of various types of semiconductor compounds, etc., that exhibits photocatalytic activity. For example, the photocatalytic component, although not limited in any way, may be at least one type of compound selected from the group consisting of titanium oxide, titanium peroxide, vanadium oxide, iron oxide, copper oxide, zinc oxide, tungsten oxide, niobium oxide, tin oxide, gallium oxide, metal salts of alkaline (earth) titanates, etc. Also, it may be a photocatalytic activity-exhibiting compound doped with at least one type of element selected from the group consisting of V, Cr, Mn, Fe, Co, Ni, Cu, Nb, Ru, Rh, Pd, Ag, Ir, Pt, Au, B, C, N, halogens (F, etc.), P, S, etc. Only one type of photocatalytic component may be used, or two or more types may be used in combination.

Preferably at least one type selected from the group consisting of anatase titanium oxide, zinc oxide and tungsten oxide, possibly doped with any of the aforementioned elements, is used. Particularly preferably at least one type selected from the group consisting of anatase titanium oxide and zinc oxide, possibly doped with any of the aforementioned elements, is used.

(Adsorbent Component)

The adsorbent component is a substance that exhibits an action to adsorb organic matter, bacteria, etc., onto its surface. Adsorbed organic matter, bacteria, etc., will be broken down or sterilized by the action of the photocatalytic compound and/or metal constituting the composite ceramic powder.

The adsorbent component may be of inorganic type, organic type, organic/inorganic composite type, or natural source type. For example, it, although not limited in any way, may be at least one type of substance selected from the group consisting of: apatite, hydroxyapatite, halogenated apatite, metal-modified apatite, tricalcium phosphate, hydrogen calcium phosphate, and other calcium phosphate-type substances; diatomaceous earth, zeolite, sepiolite, porous silica, and other silicate salt- or aluminum silicate salt-type substances; active carbon, carbon nanotubes, and other carbon-type substances; tungsten oxide, niobium oxide, zinc oxide, tin oxide, porous glass, and other metal oxide-type substances; strontium titanate and other titanate salt-type substances; EDTA and other chelate compound-type substances, and polystyrene sulfonate resins, NAFION (registered trademark) and other ion exchanger resin-type substances. Only one type of adsorbent component may be used, or two or more types may be used in combination.

Preferably at least one type selected from the group consisting of apatite, hydroxyapatite, diatomaceous earth, zeolite, active carbon, and silica is used. Particularly preferably at least one type selected from the group consisting of apatite, hydroxyapatite and zeolite is used.

(Metal Component)

The metal component demonstrates sterilizing action/antibacterial action on contact with bacteria, and comprises a simple metal, metal ion, or precursor (such as metal salt, metal oxide, etc.) from which the foregoing can be formed. It is preferably a simple metal or metal ion, or more preferably a simple metal.

Metals used for the metal component are normally transition metals and, although not limited in any way, the metal component may be at least one type selected from the group consisting of gold, silver, copper, zinc, platinum, iron, nickel, chromium, cobalt, manganese, rhodium, palladium, ruthenium, iridium, etc., for example. Only one type of metal component may be used, or two or more types may be used in combination.

Preferably at least one type selected from the group consisting of silver, copper, platinum, and nickel is used. Particularly preferably at least one type selected from the group consisting of silver and copper is used.

(Form of Composite Ceramic Powder)

The composite ceramic powder is a powder obtained by combining the aforementioned photocatalytic component, adsorbent component, and metal component in a desired manner into a composite. When making a composite, any known binding material, etc., may be used, as necessary.

Only one type of composite ceramic powder may be used, or two or more types may be used in combination.

For the composite ceramic powder, preferably one that uses photocatalytic titanium dioxide and/or photocatalytic zinc oxide as the photocatalytic component, hydroxyapatite and/or apatite as the adsorbent component, and silver and/or copper as the metal component, is used.

The composite ceramic powder may have any desired composite form and, although not limited in any way, the composite ceramic powder may be of at least one form selected from the group consisting of the following, for example: (1) the photocatalytic component, the adsorbent component, and metal component are bonded together; (2) the surface of the photocatalytic component is partially coated with the adsorbent component and metal component; (3) the surface of the bonded body of photocatalytic component and metal component is partially coated with the adsorbent component; (4) the surface of the photocatalytic component is partially coated with the adsorbent component, and the coated surface is partially coated with the metal component; and (5) the photocatalytic component and metal component are adsorbed onto the adsorbent component.

(Composition of Composite Ceramic Powder)

The quantity ratio of photocatalytic component, adsorbent component, and metal component may be adjusted according to desired properties, etc.

The photocatalytic component may account for 0.01 to 99.9 mass %, or preferably 1 to 99 mass %, or more preferably 1 to 90 mass %, or most preferably 20 to 90 mass %, of the total composite ceramic powder.

The adsorbent components may account for 0.01 to 99.9 mass %, or preferably 0.5 to 90 mass %, or more preferably 1 to 80 mass %, or most preferably 5 to 75 mass %, of the total composite ceramic powder.

The metal component may account for 0.01 to 99.9 mass %, or preferably 1 to 99 mass %, or more preferably 3 to 95 mass %, or most preferably 5 to 75 mass %, of the total composite ceramic powder.

(Preparation of Composite Ceramic Powder)

The composite ceramic powder may be prepared according to a known method, or a commercial product may be used.

The method for preparing the composite ceramic powder, although not limited in any way, may be at least one type selected from the group consisting of, for example, methods whereby the photocatalytic component in powder and/or fluid dispersion form, the adsorbent component in powder and/or fluid dispersion form, and the metal component in powder and/or fluid dispersion form, are mixed into a composite by adjusting the temperature and/or pressure as necessary and using any of various types of mixing apparatuses as necessary, for example.

The various types of mixing apparatuses include, for example, a paint shaker, butterfly mixer, planetary mixer, pony mixer, dissolver, tank mixer, homo mixer, Homo Disper, and other mixers, an attritor, roll mill, sand mill, ball mill, bead mill, line mill, ultrasonic mill, DYNO-MILL, shot mill, and other mills, a kneader, mixing and kneading apparatus, high-pressure collision dispersing apparatus, etc.

The mixing order and quantities of the components to be turned into a composite can be set as deemed appropriate. For example, the following methods or the like are available: (1) simultaneously mixing all of the photocatalytic component in powder and/or fluid dispersion form, the adsorbent component in powder and/or fluid dispersion form, and the metal component in powder and/or fluid dispersion form; (2) mixing any two components and then mixing in the remaining component; and (3) mixing a part or all of any one component with a part or all of any one component, and then mixing in the remaining component. Also, mixing may be performed once or multiple times using one type of mixing apparatus, or mixing may be performed multiple times using two or more types of mixing apparatuses. Liquid components and various additive components may be added further as necessary, and mixed using any of the aforementioned mixing apparatuses as necessary.

Commercially available composite ceramic powders or products containing composite ceramic powder include, for example, Apatek (manufactured by Marutake Sangyo, Ltd.), Earthplus (manufactured by Shinshu Ceramics Co., Ltd.), and Super Lumititan Powder (manufactured by Sasamic Co., Ltd.), and the like.

(Content of Composite Ceramic Powder)

The content of composite ceramic powder in the antibacterial coating material, although not limited in any way, may be 0.1 to 30 mass %, or preferably 0.5 to 15 mass %, or more preferably 1 to 10 mass %, or even more preferably 1 to 5 mass %, relative to the total antibacterial coating material, from the viewpoints of antibacterial property, dispersibility, productivity of coating material, etc. Also, in solids content ratio in the antibacterial coating material, it may account for 1 to 95 mass %, or preferably 1 to 50 mass %, or more preferably 3 to 30 mass %, or yet more preferably 5 to 20 mass %. Too high a content of composite ceramic powder may present disadvantages in terms of coating film strength and cost, while too low a content may result in a failure to achieve the desired antibacterial activity.

<Binder>

The binder (binding agent) may be any binder known as a component of coating material, and an inorganic and/or organic binder(s) may be used. The binder acts to fix the composite ceramic powder in the coating film, for example. The binder may take any form, such as solvent type, emulsion (dispersion) type, non-solvent type, one-part liquid type, multiple-part liquid type, or powder type.

The inorganic binder, although not limited in any way, may be at least one type selected from the group consisting of silica binders, zirconia binders, alumina binders, titania binders, water glasses (sodium silicate, potassium silicate, lithium silicate), etc., for example.

The organic binder, although not limited in any way, may be at least one type selected from the group consisting of (meth)acrylics, styrenes, vinyl acetates, rubbers, vinyl chlorides, vinyl alcohols, polyolefins, polyesters, fluororesins, silicones, urethans, epoxys, core-shell polymers, curing compounds containing ethylenic unsaturated bonds (such as (meth)acrylate monomers and vinyl monomers), etc., for example.

The organic binder may further contain any curing agent used in the field of coating materials. The curing agent, although not limited in any way, may be at least one type of compound selected from the group consisting of polyisocyanate compounds, polyol compounds, polycarboxylic acid compounds, melamine compounds, epoxy compounds, aldehyde compounds, aziridine compounds, etc., for example.

For the binder, preferably at least one type selected from the group consisting of (meth)acrylics, polyesters, fluororesins, silicones, urethanes, epoxys, acrylate monomers, etc., each possibly containing a curing agent, is used. Particularly preferably at least one type of binder selected from the group consisting of (meth)acrylics, urethanes, fluororesins, and acrylate monomers, each possibly containing a curing agent, is used.

The content of binder may be 1 to 50 mass %, or preferably 5 to 40 mass %, or more preferably 10 to 30 mass %, relative to the total antibacterial coating material, from the viewpoints of antibacterial property, dispersibility, formability of coating film, etc. Also, in solids content ratio in the antibacterial coating material, it may account for 50 to 99 mass %, or preferably 70 to 97 mass %, or more preferably 80 to 95 mass %. Too high a content of binder may result in a failure to achieve the desired antibacterial activity and could present disadvantages in terms of coating film strength and cost, while too low a content may result in a failure to achieve the desired antibacterial activity and could present problems in terms of coating film strength and dispersibility.

<Other Components>

According to the required purpose, etc., the antibacterial coating material constituting the antibacterial coated product may further have various components added to it that are generally used for the purpose of forming a coating material. For example, these components include, but are not limited in any way to, solvent, coloring agent, extender, pigment, or other filler, viscosity adjusting agent, sterilizing/antifungal agent other than what is used in the composite ceramic powder, surface conditioner, dispersant, surfactant, UV absorbent, photostabilizer, defoaming agent, etc. The content of each component may be adjusted as desired according to the purpose of adding such component, etc.

The solvent is not limited in any way, and at least one type selected from the group consisting of water, organic solvent, carbon dioxide, etc., may be used for the purpose of viscosity adjustment, dilution, etc.

For example, the organic solvent, although not limited in any way, may be at least one type selected from the group consisting of: ethanols, propanols, butanols, and other alcohols; acetones, methyl ethyl ketones, cyclohexanones, and other ketones; methylene chloride and other halogenated hydrocarbons; benzenes, toluenes, xylenes, and other aromatic hydrocarbons; methyl pyrrolidones, dimethyl acetoamides, and other amides; ethyl acetates, butyl acetates, and other esters; diethyl ethers, tetrahydrofurans, dioxanes, and other ethers; ethylene glycol monomethyl ethers, ethylene glycol dimethyl ethers, and other glycol ethers; γ-butyrolactones and other cyclic esters; and mineral spirits and other aliphatic hydrocarbons, and the like.

The coloring agent is not limited in any way, and at least one type selected from the group consisting of inorganic coloring pigments, organic coloring pigments, fluorescent pigments, luster pigments, coloring resin grains, dyes, etc., having at least one type of color selected from the group consisting of red, blue, yellow, green, purple, black, white, orange, brown, etc., for example, may be used for the purpose of adding a desired shade of color to the coating film. These pigments may each be a self-dispersing type characterized by at least one type of hydrophilic group or lipophilic group bonded to the surface of the pigment directly or via any of various atomic groups, or they may each be a pigment whose surface has been modified by any of various surface modifiers.

The extender pigment or other filler, although not limited in any way, may be at least one type selected from the group consisting of talc, mica, barium sulfate, clay, calcium carbonate, kaolin, silica, bentonite, barium carbonate, zirconia, alumina, etc., for example. Also, a pigment whose surface has been modified by any of various surface modifiers may be used.

The viscosity adjusting agent, although not limited in any way, may be at least one type of compound selected from the group consisting of celluloses, polyamines, starches, alginic acids, fatty acid esters, polyvinyl alcohols, polyacrylic acid (polyacrylate)s, etc., for example.

Among the other components, the sterilizing/antifungal agent other than what is used in the composite ceramic powder, although not limited in any way, may be at least one type selected from the group consisting of dehydro-sodium acetate, sodium benzoate, sodium pyridinethione-1-oxide, p-hydroxy-benzoate ethyl ester, 1,2-benzisothiazoline-3-one, and salts thereof, for example.

[Base Material]

The base material on which the antibacterial coating material is applied may be any material on which a coating material can be applied and the addition of antibacterial performance to which is desired.

The material constituting the base material, although not limited in any way, may be iron, aluminum or other metal, glass, concrete, various plastics, paper, wood, etc., for example, and it may be a laminated body, composition, or other composite material containing at least one type among the foregoing, or a coated surface.

The base material constituting the antibacterial coated product, although not limited in any way, may be any of various articles, daily supplies, sanitary devices, medical devices, dental devices, various articles, or areas thereof that are contacted by people, and various articles or areas thereof to which bacteria may attach, and the like, which are installed and/or used at medical institutions, commercial facilities, schools, public facilities, food factories, etc., as well as where care is given, cooking is done, or foods/beverages are handled, and inside transportation facilities (ships, airplanes, buses, trains, etc.), automobiles, etc., for example.

Such articles, etc., include, for example, doors, door knobs, handrails, handles, walls, floors, glass, construction materials, tables, chairs, household appliances, writing instruments, stationery, office supplies, medical devices, pushbuttons, personal computers, keyboards, mouse devices, touch panels, mobile communication devices, electronic medical charts, display devices, desks, drawers, files, nameplates/display plates, operation buttons, switches, displays, remote controllers, toys, gaming machines, daily supplies, cooking equipment, tableware, smoking supplies, various containers, cleaning supplies, interior materials, automotive interior furnishings, automotive parts, articles used on vehicles, toilets, bathroom interior furnishings, articles used on ships, aircraft interior furnishings, and articles used in the periphery thereof, and the like.

[Method for Forming Coating Film]

Regarding the method for forming coating film, any general method for forming a film of coating material on an article, base material, etc., may be adopted according to the shape or purpose of use of article, base material, etc. For example, such method, although not limited in any way, may be at least one type selected from the group consisting of air spray, air-less spray, electrostatic, rotary atomization, brush, roller, hand gun, universal gun, soak, roll coater, curtain flow coater, roller curtain coater, die coater, inkjet methods, and the like. Preferably at least one type of method selected from the group consisting of air spray, air-less spray, electrostatic, rotary atomization, brush, handgun, universal gun, and inkjet methods is used.

When the antibacterial coating material is applied on the base material, the coating surface, if contaminated with oil or other contaminant, is preferably degreased/cleaned with alcohol, etc. To improve the adhesion and corrosion resistance between the base material and the coating film, any known surface treatment such as roughening, plasma treatment, flame treatment, or priming may be performed.

After the antibacterial coating material has been applied, the coating film may be dried by means of room temperature drying, forced drying, etc., to form a coated product. In the case of room temperature drying, it only needs to be kept stationary at room temperature (such as 10° C. or higher but lower than 40° C.). In the case of forced drying, the coating film may be dried using a blower, etc., or it may be heated at 50° C. or higher temperature for 1 minute or longer to be drying and baking. Also, if the binder is of curing type, it may be cured with UV or other energy beam or heat. From the viewpoint of finishing quality, it may be set (kept stationary) at room temperature prior to drying or curing.

When forming a coating film, it may be provided through a single application or two or more applications. If two or more applications are performed, a drying process may be provided in between, or each subsequent application may be performed wet on wet without providing a drying process in between, or the two approaches may be combined.

[Coating Film Thickness]

On the antibacterial coated product, the thickness (dry film thickness) of the coating film formed by the antibacterial coating material is not limited in any way and may be adjusted as deemed appropriate according to the purpose, etc. For example, it may be adjusted to between 0.1 and 1000 μm, such as 80 μm or less, or preferably 50 μm or less, or more preferably 30 μm or less, or yet more preferably in a range of 1 to 20 μm, in dry film thickness.

By adjusting the dry film thickness to 80 μm or less, the transparency of the coating film on the antibacterial coated product can be increased further. Another point is that, even when a coating film is to be provided on a keyboard or other article having moving parts, an antibacterial coating film can be formed without affecting the moving parts.

A dry coating film exceeding 100 μm may lead to disadvantages in terms of cost, transparency, etc.

A dry film thickness of less than 1 μm requires advanced application technology and may lead to disadvantages in terms of cost.

[Antibacterial Activity]

Under the present invention, the antibacterial activity of the coating film of the antibacterial coating material on the antibacterial coated product is 2.0 or higher. The antibacterial activity can be 4.0 or higher, and in some cases the antibacterial activity can be even 6.0 or higher.

Under the present invention, "antibacterial activity" refers to the index value according to the test method described in JIS Z 2801: 2010, "Antibacterial Products—Test for Antibacterial Activity and Efficacy."

The antibacterial activity represents a value obtained as the difference between the average logarithmic value of viable bacterial count in an antibacterial-treated product and that in a non-treated product, following 24 hours of culturing of prescribed bacteria inoculated in both, where an antibacterial activity of 2.0 or higher is interpreted as an evidence of antibacterial effect.

The coating material proposed by the present invention can be used, through a simple application on the surface of an article, etc. requiring antibacterial treatment, to constitute an antibacterial coated product that has been antibacterial-treated to an antibacterial activity of 2.0 or higher. Additionally, provided are an antibacterial coated product and an antibacterial coating material—both of which do not induce skin disorders, etc. caused by elution of the antibacterial component, and can manifest antibacterial effect over a long period of time starting from immediately after the formation of the coating film—as well as a method for manufacturing such antibacterial coating material and a method for manufacturing such antibacterial coated product. In particular, various materials, equipment, etc., used in a medical setting can be easily converted to antibacterial specifications of 2.0 or higher in antibacterial activity through post-processing that involves application of the antibacterial coating material proposed by the present invention.

[Volume Average Dispersed Particle Diameter]

Under the present invention, the volume average dispersed particle diameter ($D_{50}$) of the composite ceramic powder in the antibacterial coating material constituting the coating film on the antibacterial coated product, although not limited in any way, may be 250 nm or smaller, or preferably 30 nm or greater but no greater than 220 nm, or more preferably 50 to 210 nm.

If the volume average dispersed particle diameter ($D_{50}$) of the composite ceramic powder exceeds 250 nm, the storage stability of the coating material may drop, the powder may not disperse evenly in the coating material or coating film, the coating material or coating film may become cloudy and therefore less transparent, or the antibacterial performance of the coating film may drop, for example. On the other hand, achieving a volume average dispersed particle diameter ($D_{50}$) smaller than 30 nm requires advanced dispersion techniques and presents problems in terms of cost, etc.

If the volume average dispersed particle diameter is 100 to 250 nm, a faint-colored transparent coating film showing slight color corresponding to the material color of the composite ceramic powder can be constituted. Such faint-colored transparent coating film can provide a clean-looking antibacterial coated product without interfering with the visibility of any text, pattern, etc., on the surface of the base material, and because presence of the coating film can be identified with ease, such coating film also has the effect of calling one's attention to the antibacterial treatment.

Also, setting a volume average dispersed particle diameter smaller than 100 nm allows for formation of a colorless transparent coating film which can be applied to base materials that do not favor coloring. Also, a coating film of any desired shade of color can be constituted easily by using a coloring agent.

[Ratio of 90% Cumulative Volume Particle Diameter and Volume Average Dispersed Particle Diameter, or $D_{90}/D_{50}$]

The ratio of the 90% cumulative volume particle diameter ($D_{90}$) and the volume average dispersed particle diameter ($D_{50}$), of the composite ceramic powder in the antibacterial coating material constituting the antibacterial coated product, or $D_{90}/D_{50}$, is adjusted to 1.5 or lower, or preferably 1.3 or lower, or more preferably 1.2 or lower.

As $D_{90}/D_{50}$ approaches 1.0, the grain diameter distribution becomes sharper and the grain diameters become closer to uniform. As a result, the fine composite ceramic powder can disperse evenly in the coating film, which in turn improves the transparency of the coating film and makes the antibacterial activity of the coating film uniform. If $D_{90}/D_{50}$ exceeds 1.5, the grain diameter variability of the composite ceramic powder contained in the coating material increases. This means that, because coarse grains of large grain diameters are present in the coating film, the composite ceramic powder disperses unevenly in the coating film and the coating film becomes cloudy and its transparency drops, a potential result of which is non-uniform antibacterial activity of the coating film.

Under the present invention, adjusting $D_{90}/D_{50}$ to 1.5 or lower allows the composite ceramic powder, which is an antibacterial agent, to disperse evenly in the coating film and therefore antibacterial property can be expressed evenly over the entire coating film, which consequently leads to a higher antibacterial activity.

[Haze]

Under the present invention, the haze of the coating film of the antibacterial coating material on the antibacterial coated product, although not limited in any way, may be 25 or lower, or preferably 20 or lower, or more preferably 10 or lower.

Under the present invention, "haze" with respect to the coating film of the antibacterial coating material, refers to the index value according to the test method described in JIS K 7136: 2000, "Plastics—Determination of Haze for Transparent Materials." Haze is an index indicating the degree of transparency/cloudiness of a coating film, where the lower the haze, the higher the transparency. In general, it can be measured using a haze meter.

To keep the haze of the coating film of the antibacterial coating material at 25 or lower, preferably a binder, etc., of high transparency is used, while at the same time the average grain diameter (volume average dispersed particle diameter) of the composite ceramic powder is adjusted to a size in the Rayleigh scattering region that covers wavelengths far shorter than those of visible light (approx. one-tenth the wavelengths of light).

By adjusting the haze of the coating film to 25 or lower, an antibacterial coating film can be provided also on touch panels and other articles, etc., requiring transparency. Additionally, an antibacterial coating film can be formed on keyboards and other articles, etc., without having to conceal the symbols, etc., on the article surface.

In addition, its excellent coating film transparency also allows the antibacterial coating material proposed by the present invention to easily constitute an antibacterial coating film meeting a desired coloring level, through compounding of a coloring agent into the antibacterial coating material.

[Requirement(s) of (1) and/or (2)]

The antibacterial coated product proposed by the present invention satisfies the requirement(s) of (1) and/or (2) below:

(1) with respect to the composite ceramic powder in the antibacterial coating material, the volume average dispersed particle diameter ($D_{50}$) is 250 nm or smaller, and the ratio of the 90% cumulative volume particle diameter ($D_{90}$) and the volume average dispersed particle diameter ($D_{50}$), or $D_{90}/D_{50}$, is 1.5 or lower; and (2) the thickness of the coating film is 80 μm or smaller and the haze (according to JIS K 7136: 2000) of the antibacterial coated product or coating film is 25 or lower.

Under the present invention, it is particularly preferable to satisfy the requirements of (1) and (2). This way, the composite ceramic powder, which is an antibacterial agent, can be dispersed evenly in the coating film to allow antibacterial property to be expressed uniformly over the entire coating film, which in turn allows for formation of a coating film having a higher antibacterial activity and formation of a coating film offering excellent transparency.

[Reflection Haze Value]

Under the present invention, adjustments may be made so that the reflection haze value of the coating film of the antibacterial coating material on the antibacterial coated product becomes 50 to 600. It is preferably 100 to 600, or more preferably 150 to 500.

Under the present invention, the reflection haze value of the coating film of the antibacterial coating material conforms to the measurement method described in ASTM E430. To be specific, it is calculated by making a light flux having a specified opening angle incident on the surface of a sample at an incident angle of 20 degrees, while using an optical receiver to measure the resulting light flux having a certain opening angle as reflected in directions offset from the direction of specular reflection by 0.9 degrees in the forward direction and the opposite direction, respectively, and then applying the measured values to a specific calculation formula. In general, it can be measured using Haze-Gloss (product name; a glossmeter manufactured by Gardner Company, Inc.), etc.

By adjusting the reflection haze value to between 50 and 600, or especially between 150 and 500, a coating film having excellent designability can be formed; in particular, a coating film that creates a sense of beauty similar to that of lacquer wear can be formed.

2 Antibacterial Coating Material

The antibacterial coating material proposed by the present invention is an antibacterial coating material that contains at least a composite ceramic powder containing a photocatalytic component, adsorbent component, and metal component, and a binder, wherein:

the volume average dispersed particle diameter ($D_{50}$) of the composite ceramic powder in the antibacterial coating material is 250 nm or smaller, and the ratio of the 90% cumulative volume particle diameter ($D_{90}$) and the volume average dispersed particle diameter ($D_{50}$), or $D_{90}/D_{50}$, of the composite ceramic powder, is 1.5 or lower; and the antibacterial activity (according to JIS Z 2801: 2010) of the coating film is 2.0 or higher.

Here, "composite ceramic powders," "binder," "volume average dispersed particle diameter" and "$D_{90}/D_{50}$" have the same meanings as described in "1 Antibacterial Coated Product" above.

3 Method for Manufacturing Antibacterial Coating Material

The method for manufacturing antibacterial coating material proposed by the present invention is a method for manufacturing an antibacterial coating material whose coating film has an antibacterial activity (according to JIS Z 2801: 2010) of 2.0 or higher, which includes a step to mix, using a dispersing machine, constitutive components of antibacterial coating material including at least a composite ceramic powder containing a photocatalytic component, adsorbent component, and metal component, and a binder, wherein:

the volume average dispersed particle diameter ($D_{50}$) of the composite ceramic powder in the antibacterial coating material is set to 250 nm or smaller, and the ratio of the 90% cumulative volume particle diameter ($D_{90}$) and the volume average dispersed particle diameter ($D_{50}$), or $D_{90}/D_{50}$, of the composite ceramic powder, is set to 1.5 or lower.

Here, "composite ceramic powders," "binder," "volume average dispersed particle diameter" and "$D_{90}/D_{50}$" have the same meanings as described in "1 Antibacterial Coated Product" above.

For the dispersing machine used in the mixing step, any dispersing machine generally used in the manufacture of coating materials may be used. For the dispersing machine, at least one type selected from the group consisting of the following may be used, for example: ball mill, attritor, bead mill, sand mill, and other media-type dispersing machines; planetary mixer, homo mixer, Disper, high-speed disperser, homogenizer, roll mill, cone mill, colloid mill, kneader, and other shearing-type dispersing apparatus; paint shaker, wet jet mill, ultrasonic dispersing machine, etc. It should be noted that, if a media-type dispersing machine is used, at least one type of dispersion media selected from the group consisting of alumina, zirconia, glass, silica, ceramics, etc., may be used.

Preferably at least one type selected from the group consisting of ball mill, attritor, bead mill, sand mill, and other media-type dispersing machines, paint shaker, and the like is used.

Under the present invention, the volume average dispersed particle diameter ($D_{50}$) of the composite ceramic powder in the antibacterial coating material may be set to 250 nm or smaller by adjusting the type of dispersing machine, type/shape of dispersion media, operating conditions of the dispersing machine, and so on. Also, the ratio of the 90% cumulative volume particle diameter ($D_{90}$) and the volume average dispersed particle diameter ($D_{50}$), or $D_{90}/D_{50}$, of the composite ceramic powder in the antibacterial coating material, may be set to 1.5 or lower.

In the antibacterial coating material thus manufactured, it is considered that the composite ceramic powder is dispersed without agglutinating in the coating material and virtually remains in this dispersed state as it is distributed in the coating film, which is advantageous in terms of transparency and antibacterial activity.

4 Method for Manufacturing Antibacterial coated Product

The method for manufacturing antibacterial coated product proposed by the present invention is a method for manufacturing an antibacterial coated product whose coating film has an antibacterial activity of 2.0 or higher, produced by applying on a base material a coating material that contains an antibacterial coating material.

The antibacterial coating material used herein is the same as described in 2, "Antibacterial Coating Material" above.

Also, the base material and method for forming coating film are the same as described in 1, "Antibacterial coated Product" above.

EXAMPLES

The present invention is explained in greater detail below by citing examples; however, the present invention is not limited to these examples. It should be noted that, in the examples and comparative examples, the properties, etc., of the antibacterial coating materials and properties, etc., of the coating films were measured/evaluated using the methods described below.

(Grain Diameters)

The volume average dispersed particle diameter ($D_{50}$) and 90% cumulative volume particle diameter ($D_{90}$), of the composite ceramic powder in each antibacterial coating material, were measured using a dynamic light-scattering particle diameter distribution measuring apparatus (LB-550 manufactured by Horiba, Ltd.).

(Storage Stability)

Each antibacterial coating material was let stand for one week at 25° C. and then visually observed and evaluated according to the criteria below:

○: There is no sediment.

X: Sediment has settled.

(Appearance of Coating Films)

Appearance of coating films was visually observed and evaluated according to the criteria below:

○: Colorless and transparent, and free of unacceptable turbidity

○ blue: Colored slightly blue, but free of unacceptable turbidity

X: Cloudy

Preparation of Antibacterial Coating Materials

Example 1

2.85 mass % of a composite ceramic powder containing photocatalytic titanium dioxide, hydroxyapatite, and silver combined into a composite, 14.29 mass % of a binder containing hydroxyl group-containing acrylic resin (acrylic polyol), and polyisocyanate curing agent, and a sufficient quantity of ethyl acetate (solvent) to bring the total to 100 mass % (to account for the remainder), were compounded and dispersed in a bead mill to prepare an antibacterial coating material.

Examples 2, 3

Antibacterial coating materials were prepared in the same manner as described in Example 1, except that the operating conditions of the bead mill were changed when the respective components were dispersed using the bead mill.

Comparative Example 1

5.70 mass % of a composite ceramic powder containing photocatalytic titanium dioxide, hydroxyapatite, and silver combined into a composite, 14.29 mass % of a binder containing hydroxyl group-containing acrylic resin (acrylic polyol) and polyisocyanate curing agent, and a sufficient quantity of ethyl acetate (solvent) to bring the total to 100 mass % (to account for the remainder), were compounded and dispersed in a bead mill to prepare an antibacterial coating material.

Comparative Example 2

A commercially available photocatalytic indoor coating material "Lumititan NAG" (product name manufactured by Sasamic Co., Ltd.; coating material in Patent Literature 1 (Japanese Patent No. 5207744)), which contains nano-silver-supporting apatite-coated titanium dioxide, was used as an antibacterial coating material. It should be noted that, since substantial sediment was found in the container of Lumititan NAG, the content was mixed under agitation by shaking the container, and used without dilution as a coating material.

<Evaluation of Antibacterial Coating Materials>

The antibacterial coating materials in Examples 1 to 3 and Comparative Examples 1 and 2 were evaluated for storage stability. Also, the antibacterial coating materials in Examples 1 to 3, which were found colorless and transparent or faint-colored and transparent by visual evaluation, were measured for volume average dispersed particle diameter ($D_{50}$), 90% cumulative volume particle diameter ($D_{90}$), and ratio of 90% cumulative volume particle diameter ($D_{90}$), and volume average dispersed particle diameter ($D_{90}/D_{50}$). It should be noted that measurement using a dynamic light-scattering particle diameter distribution measuring apparatus was not performed on the antibacterial coating materials in Comparative Examples 1 and 2, because the coating materials were found cloudy by visual evaluation and the volume average grain diameters of the composite ceramic powders were clearly over 250 nm. These results are shown in Table 1.

TABLE 1

| Antibacterial coating material | Example 1 | Example 2 | Example 3 | Comparative Example 1 | Comparative Example 2 |
|---|---|---|---|---|---|
| Volume average dispersed particle diameter ($D_{50}$) | 65 | 139 | 208 | >250 | >250 |
| 90% Cumulative volume particle diameter ($D_{90}$) | 76 | 149 | 218 | — | — |
| $D_{90}/D_{50}$ | 1.17 | 1.07 | 1.04 | — | — |
| Storage stability | ○ | ○ | ○ | ○ | X |
| Appearance of coating film | ○ | ○ blue | ○ blue | X | X |

<Optical Evaluation of Antibacterial Coated Products>

(Preparation of Antibacterial Coated Products)

The antibacterial coating materials in Examples 1 and 2 and Comparative Examples 1 and 2 were air-sprayed on clear ABS resin sheets to prepare antibacterial coated products having coating films of the dry film thicknesses shown in Table 2.

(Optical Evaluation of Antibacterial Coated Products)

Appearance of coating film was visually evaluated. Also, haze of coating film was measured with a haze meter (HZ-V3, manufactured by Suga Test Instruments Co., Ltd.). These results are shown in Table 2.

TABLE 2

| Antibacterial coating material | Examples | | Comparative Examples | |
|---|---|---|---|---|
| | Example 1 | Example 2 | Comparative Example 1 | Comparative Example 2 |
| Volume average dispersed particle diameter | 65 | 139 | >250 | >250 |
| Storage stability | ○ | ○ | ○ | X |
| Film thickness | 15 | 17 | 22 | 7 |
| Haze | 6.98 | 19.16 | 37.53 | 91.72 |
| Appearance of coating film | ○ | ○ blue | X | X |

<Antibacterial Activity Evaluation of Antibacterial Coated Products>

(Preparation of Antibacterial Coated Products)

The antibacterial coating materials in Examples 1 to 3 were air-sprayed on clear ABS sheets to prepare antibacterial coated products.

(Evaluation of Antibacterial Activity Against *Staphylococcus aureus* in Antibacterial Coated Products)

This evaluation was conducted according to the film adhesion method based on JIS Z 2801: 2010, "Antibacterial Products—Test for Antibacterial Activity and Efficacy," using specimen samples (50×50 mm) representing the antibacterial coated products obtained from the antibacterial coating materials in Examples 1 to 3, culture medium (1/500 NB culture medium), and *Staphylococcus aureus* (NBRC 12732). The specimen sample size was three.

In the test, 0.4 mL of test bacterial fluid was inoculated on each specimen sample and then a cover film was placed on top, after which the specimen sample was kept stationary at 35±1° C. and relative humidity of 90% or above to obtain the logarithmic value of viable bacteria count and equivalent value of viable bacteria count immediately after the inoculation as well as 0.5 hours, 1 hour, 2 hours, 4 hours, 6 hours and 24 hours later. The logarithmic value of viable bacteria count and equivalent value of viable bacteria count were also obtained for an untreated test piece (control) containing no antibacterial agent and having no antibacterial property.

Using these results, the antibacterial activity was obtained (antibacterial activity "R=Ut−At" as the value remaining after subtracting the logarithmic value of viable bacteria count in the specimen sample taken 24 hours later (At) from the logarithmic value of viable bacteria count taken 24 hours later in the untreated test sample containing no antibacterial agent and having no antibacterial property (Ut)). The results are shown in Table 3.

TABLE 3

| Antibacterial coating material | | Example 1 | Example 2 | Example 3 | Control |
|---|---|---|---|---|---|
| Immediately after inoculation | Logarithmic value of viable bacterial count | 4.36 | 4.40 | 4.31 | 4.41 |
| | Equivalent value of viable bacterial count | 23,125 | 25,000 | 20,625 | 25,417 |

TABLE 3-continued

| Antibacterial coating material | | Example 1 | Example 2 | Example 3 | Control |
|---|---|---|---|---|---|
| 0.5 hours later | Logarithmic value of viable bacterial count | 3.86 | 3.96 | 3.91 | 4.27 |
| | Equivalent value of viable bacterial count | 7,292 | 9,167 | 8,125 | 18,750 |
| 1 hour later | Logarithmic value of viable bacterial count | 4.10 | 4.22 | 4.10 | 4.21 |
| | Equivalent value of viable bacterial count | 12,708 | 16,458 | 12,708 | 16,250 |
| 2 hours later | Logarithmic value of viable bacterial count | 1.92 | 2.02 | 2.09 | 4.18 |
| | Equivalent value of viable bacterial count | 83 | 104 | 123 | 15,000 |
| 4 hours later | Logarithmic value of viable bacterial count | 0.77 | 0.60 | 0.02 | 4.42 |
| | Equivalent value of viable bacterial count | 6 | 4 | 1 | 26,458 |
| 6 hours later | Logarithmic value of viable bacterial count | 1.09 | 0.96 | 0.61 | 4.25 |
| | Equivalent value of viable bacterial count | 12 | 9 | 4 | 17,917 |
| 24 hours later | Logarithmic value of viable bacterial count | <−0.20 | <−0.20 | <−0.20 | 4.77 |
| | Equivalent value of viable bacterial count | <1 | <1 | <1 | 58,750 |
| Antibacterial activity | | >4.97 | >4.97 | >4.97 | — |

(Evaluation of Antibacterial Activity Against *Escherichia coli* in Antibacterial coated Products)

This evaluation was conducted according to the film adhesion method based on JIS Z 2801: 2010, "Antibacterial Products—Test for Antibacterial Activity and Efficacy," using specimen samples (50×50 mm) representing the antibacterial coated products obtained from the antibacterial coating materials in Examples 1 and 2, culture medium (1/500 NB culture medium), and *Escherichia coli* (NBRC 3972). The specimen sample size was three.

In the test, 0.4 mL of test bacterial fluid was inoculated on each specimen sample and then a cover film was placed on top, after which the specimen sample was kept stationary for 24 hours at 35±1° C. and relative humidity of 90% or above, followed by measurement of viable bacteria count. The antibacterial activity R=Ut−At was obtained by measuring the logarithmic value of viable bacteria count taken 24 hours later in the untreated test piece (control) containing no antibacterial agent and having no antibacterial property (Ut), and the logarithmic value of viable bacteria count taken 24 hours later in the specimen sample (At). The results are shown in Table 4.

TABLE 4

| Antibacterial coating material | | Example 1 | Example 2 | Control |
|---|---|---|---|---|
| Immediately after inoculation | Logarithmic value of viable bacterial count | 5.08 | 5.08 | 5.08 |
| | Viable bacterial count | 120,000 | 120,000 | 120,000 |
| 24 hours later | Logarithmic value of viable bacterial count | <1 | <1 | 7.11 |
| | Viable bacterial count | <10 | <10 | 13,000,000 |
| Antibacterial activity | | >6.11 | >6.11 | — |

As shown in Table 1 to Table 4, antibacterial coated products having an antibacterial activity of 2.0 or higher—a level required by many medical institutions—as well as highly transparent coating films with excellent appearance, can be obtained easily according to the present invention, which makes the utility value of the present invention extremely high.

What is claimed is:

1. An antibacterial coated product having, on a base material, a coating film of an antibacterial coating material that contains at least:
   a composite ceramic powder containing a photocatalytic component constituted by one or more components selected from the group consisting of anatase titanium oxide, zinc oxide, and tungsten oxide, an adsorbent component constituted by one or more components selected from the group consisting of apatite, hydroxyapatite, and zeolite, and a metal component constituted by one or more components selected from the group consisting of silver and copper, and
   a binder,
   wherein an antibacterial activity of the coating film is 2.0 or higher as measured according to JIS Z 2801: 2010, and requirements of (1) and (2) below are satisfied:
   (1) with respect to the composite ceramic powder in the antibacterial coating material, a volume average dispersed particle diameter $D_{50}$ is 30 nm to 220 nm, and a ratio of a 90% cumulative volume particle diameter $D_{90}$ to the volume average dispersed particle diameter $D_{50}$, or $D_{90}/D_{50}$, is 1.3 or lower; and
   (2) a thickness of the coating film is 80 μm or smaller and a haze of the antibacterial coated product or coating is 25 or lower as measured according to JIS K 7136: 2000.

2. An antibacterial coating material that contains at least:
   a composite ceramic powder containing a photocatalytic component constituted by one or more components selected from the group consisting of anatase titanium oxide, zinc oxide, and tungsten oxide, an adsorbent component constituted by one or more components selected from the group consisting of apatite, hydroxyapatite, and zeolite, and a metal component constituted by one or more components selected from the group consisting of silver and copper, and a binder, wherein:

a volume average dispersed particle diameter $D_{50}$ of the composite ceramic powder in the antibacterial coating material is 30 nm to 220 nm, and a ratio of a 90% cumulative volume particle diameter $D_{90}$ to the volume average dispersed particle diameter $D_{50}$, or $D_{90}/D_{50}$, of the composite ceramic powder, is 1.3 or lower; and an antibacterial activity of the coating film is 2.0 or higher as measured according to JIS Z 2801: 2010.

3. A method for manufacturing an antibacterial coated product whose coating film has an antibacterial activity of 2.0 or higher as measured according to JIS Z 2801: 2010, produced by applying on a base material a coating material that contains the antibacterial coating material according to claim 2.

4. A method for manufacturing an antibacterial coating material whose coating film has an antibacterial activity of 2.0 or higher as measured according to JIS Z 2801: 2010, which includes a step to mix, using a dispersing machine, constitutive components of the antibacterial coating material including at least:

a composite ceramic powder containing a photocatalytic component constituted by one or more components selected from the group consisting of anatase titanium oxide, zinc oxide, and tungsten oxide, an adsorbent component constituted by one or more components selected from the group consisting of apatite, hydroxyapatite, and zeolite, and a metal component constituted by one or more components selected from the group consisting of silver and copper, and a binder, wherein:

a volume average dispersed particle diameter $D_{50}$ of the composite ceramic powder in the antibacterial coating material is set to 30 nm to 220 nm, and a ratio of a 90% cumulative volume particle diameter $D_{90}$ to the volume average dispersed particle diameter $D_{50}$, or $D_{90}/D_{50}$, of the composite ceramic powder, is set to 1.3 or lower.

* * * * *